United States Patent [19]

Foley et al.

[11] 3,971,750

[45] July 27, 1976

[54] FIRE RESISTANT EPOXY RESINS CURED WITH PHOSPHORUS TRIHALIDES

[75] Inventors: Kevin M. Foley, Hebron; Reuben H. Bell, Cincinnati; Frank P. McCombs, Granville, all of Ohio

[73] Assignee: Owens-Corning Fiberglas Corporation, Toledo, Ohio

[22] Filed: Apr. 21, 1975

[21] Appl. No.: 569,905

[52] U.S. Cl............................. 260/37 EP; 428/417; 428/418; 260/2 P; 260/47 EC; 260/59 EP; 260/DIG. 24
[51] Int. Cl.² ................... C08G 51/10; C08G 30/10
[58] Field of Search............. 260/47 EC, 2 EC, 2 P, 260/59, 45.7 P, DIG. 24, 37 EP

[56] References Cited
UNITED STATES PATENTS
3,412,055  11/1968  Koral ........................ 260/47 EC X

OTHER PUBLICATIONS

Handbook of Epoxy Resins by Lee & Neville, 1967, (pp. 5–32, 37, 39, 14–47 to 50, 20–13, 14).

*Primary Examiner*—Murray Tillman
*Assistant Examiner*—T. Pertilla
*Attorney, Agent, or Firm*—John W. Overman; Patrick P. Pacella

[57] ABSTRACT

We have developed new and useful epoxy resins which have excellent fire resistance. We prepare these resins by using phosphorus trihalides or phosphorus oxyhalides to cure conventional epoxy resins.

18 Claims, No Drawings

FIRE RESISTANT EPOXY RESINS CURED WITH PHOSPHORUS TRIHALIDES

This invention relates to epoxy resins we cured with a phosphorus containing material.

Curable epoxy resins are old in the art. Industry has long used them in castings, moldings, films, and the like. Epoxies also have found use in various types of adhesives. They are known for their excellent strength and chemical resistance.

Cured epoxies, however, generally suffer because of poor fire resistance. For example, They are not self-extinguishing. One solution to this problem has been to brominate the epoxy resin. Brominated epoxies, however, are more difficult to prepare than conventional epoxy resins, cost more, and are usually harder to handle because they are solids rather than liquids.

We now have developed epoxy resins with excellent fire resistance. We prepare them by using phosphorus trihalides or phosphorus oxyhalides to cure conventional epoxy resins. These cured resins have excellent fire resistance, eliminate bromination, and cost no more than or less than conventionally cured epoxy resins.

The halides we employ are a chloride or a bromide. We prefer phosphorus trichloride or phosphorus oxychloride as the epoxy hardening agent.

The epoxy resins are old in the art and have been on the market in the United States since the late 1940's and some years earlier in Europe.

The simplest epoxy resin and possibly the best known in the reaction of bisphenol-A and epichlorohydrin having the formula:

nates (pipe, filament wound vessels, high and low pressure glass laminates), electrical laminates (printed circuits), potting and encapsulation, castings, adhesives, tooling, masonry surfacing and repair, rocket fuel binders, household and boat repair kits, and many others.

Epoxy novolac resins have all the characteristics of the bisphenol-A type resins mentioned previously. They also provide higher service temperatures and greater chemical resistance. Epoxy novolac resins have the following general formula:

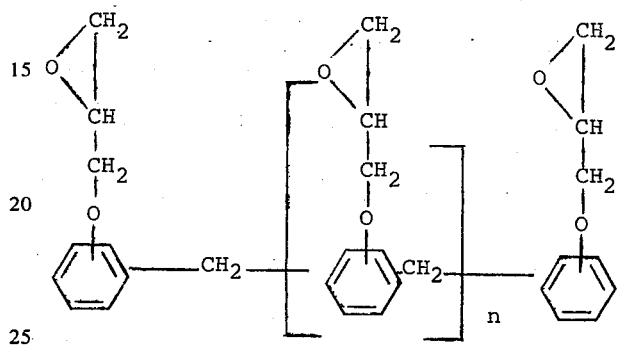

The value of $n$ typically varies from 0.2 to 2.0.

The epoxy novolac molecule will cross-link into a denser, more complex three-dimensional form than is possible with bisphenol-A type resins whose epoxy functionality can be only 2 at best. This characteristic is responsible for the greater resistance of epoxy novolac resins to both heat and chemical attack.

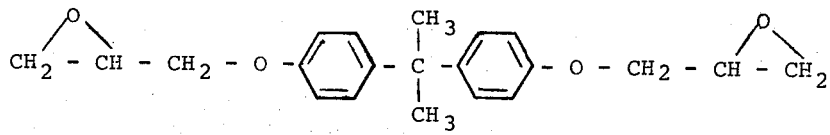

This is 2,2-bis [4-(2' 3' epoxy propoxy) phenyl] propane, commonly called diglycidyl ether of disphenol-A.

The higher molecular weight homologs have the structure:

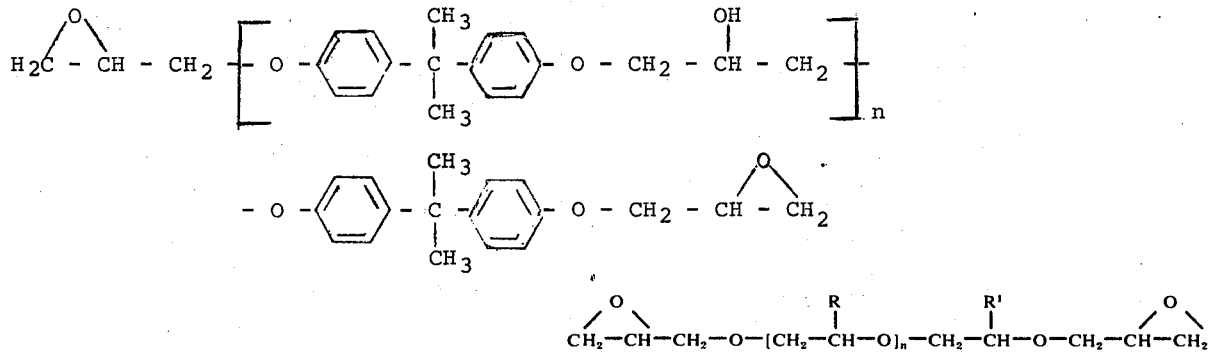

Flexible epoxy resins are low viscosity resins we use to modify bisphenol-A or novolac epoxy resins to provide better impact resistance, elongation, or flexibility. These resins have the formula:

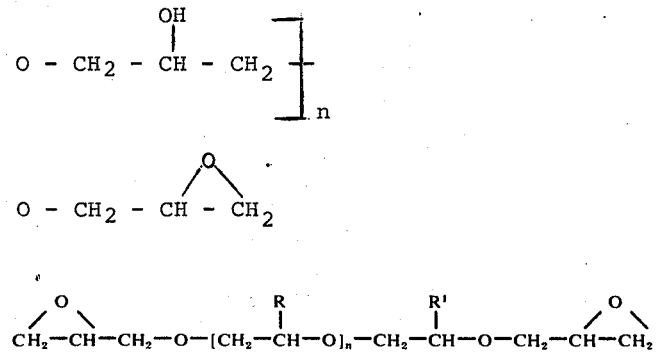

The value of $n$ ranges from essentially zero to about 30. The resins are liquid up to an epoxide equivalent weight of about 300 and are solids at higher epoxide equivalent weights.

The many end uses for bisphenol-A type epoxies include corrosion resistant coatings, structural lami- The value of $n$ varies typically from 0 to about 6.

Since the epoxy resin and halide hardening agent are co-reactants, the preferred ratio of these materials is one epoxy equivalent weight to one halogen equivalent weight. Quite naturally, however, this ratio can vary widely from the equivalent weight proportion. Generally, the ratio of epoxy equivalent weight to halogen equivalent weight can range from 1:3 to 3:1.

The manner by which conventional anhydride epoxy curing agents function is old in the art. For example, Dow Chemical Company distributes a booklet 190-18-72 which discusses them.

Industry often uses small amounts of tertiary amine catalysts with the conventional anhydride curing agents to speed the curing of the epoxy resin. Tertiary amines, amine salts, boron trifluoride complexes and amine borates all promote epoxy to epoxy or epoxy to hydroxyl reactions, yet do not themselves serve a direct crosslinking agents. The result is a dense cross-linked structure containing stable ether linkages.

Aliphatic or aromatic primary and secondary polyfunctional amines also act as curing agents with epoxy resins. They react with the epoxy groups through the active amine hydrogen. Each primary amine is theoretically capable of reacting with 2 epoxide groups and each secondary amine is capable of reacting with one epoxide group.

The phosphorus trihalides we employ can open an epoxide ring and function as a cross-linking agent much like a primary amine. The reaction is:

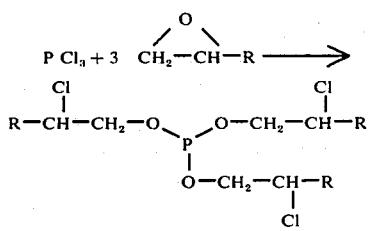

The phosphorus oxyhalides react in a similar manner. Preferably, however, a tertiary amine catalyst is present. The reaction is:

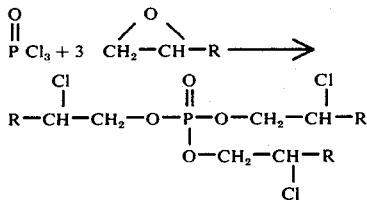

As a result of our employing a phosphorus trihalide or phosphorus oxyhalide hardening agent, both phosphorus and halogen are present in the cured epoxy resin. We have added fire retardant properties to the cured epoxy resin without increasing the cost of curing the resin.

We can carry out our reaction in one step if sufficient means are present to remove the exothermic heat of reaction. We prefer, however, to carry out the reaction in 2 or 3 steps due to the large exotherm involved. We do this by adding the halide hardening agent in 2 or 3 portions. If we employ a tertiary amine catalyst, we can also control the exotherm by varying the amount of catalyst.

We can incorporate reinforcing materials such as glass fibers into the epoxy system of this invention. Generally, we would employ a mat of randomly oriented glass fibers. The amount of glass fiber in the product can vary from greater than 0 to 50 weight percent. Generally 15 to 50 weight percent of the product is glass fiber.

The following examples further illustrate our invention.

EXAMPLE I

This example demonstrates the curing of an epoxy resin with phosphorus trichloride.

We placed 200 grams of epoxy resin DER 332 from Dow Chemical Company, 2,2-bis [4-(2', 3' epoxy propoxy) phenyl] propane, (1.15 epoxy equivalents, epoxy equivalent weight of 174) in a 500 ml resin pot equipped with a mechanical stirrer, addition funnel and reflux condenser. We then rapidly added 100.3 ml of phosphorus trichloride (1.15 mol, 3.45 phosphorus - chlorine equivalents) to the pot with stirring. The reaction warmed and began to reflux. Refluxing stopped after the reaction consumed all the phosphorus trichloride. We allowed the reaction to cool and obtained a viscous liquid with 0.287 phosphorus chlorine equivalents and a phosphorus chlorine equivalent weight of 155.7. The product was a mixture with the major component being:

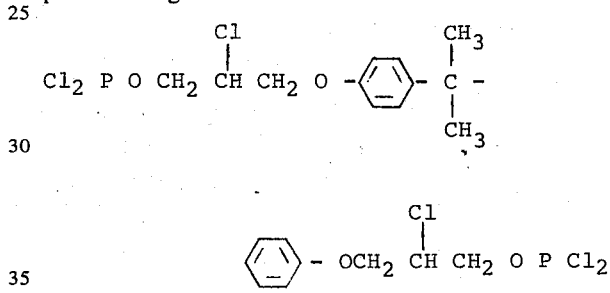

We then added 50 grams of DER 332 (0.287 epoxy equivalents, epoxy equivalent weight of 174) to 44.7 grams of the above product in a 250 ml beaker. The result was a hard polymeric product similar to that obtained when we cure DER 332 with an aliphatic amine such as DEH 24 from Dow Chemical Company.

EXAMPLE II

This example demonstrates the fire resistance properties of the cured resin of Example I.

We placed a sample of that product 1 inch square and ¼ inch thick in the flame of a Fisher burner until it appeared to us that combustion had occured. The flame of the sample immediately extinguished when we removed it from the flame of the Fisher burner. The sample was self-extinguishing.

EXAMPLE III

This example demonstrates the curing of an epoxy resin with phosphorus oxychloride.

We mixed 50 grams of epoxy resin Araldite 6005 (0.2703 epoxy equivalents, epoxy equivalent weight of 185) from Ciba Geigy with 8.25 ml of phosphorus oxychloride (0.0901 mol, 0.2703 phosphorus-chlorine equivalents) and 0.75 ml. (0.00846) mol of pyridine catalyst in a beaker. After approximately 2 minutes, the reaction mixture got hot, darkened in color, and set up to give a hard polymeric product.

EXAMPLE IV

We repeated the procedure of Example III except that we only used 0.05 ml (0.000564 mol) of pyridine.

We sealed the beaker from the atmosphere. The beaker did not become warm. After 4 days, the contents of the beaker were hard, indicating a hard polymeric product.

EXAMPLE V

We tested samples of the cured resins of Examples III and IV according to the procedures of Example II for fire resistance. We found that the samples immediately extinguished when we removed them from the flame of the Fisher burner. The samples were self-extinguishing.

The curing of these epoxy resins was no more complicated than cures employing conventional hardening agents, yet self-extinguishing products were the result. A result we achieved without added cost and without hazardous bromination procedures.

We intend to include modifications and variations within the scope and spirit of this invention.

We claim:

1. A curable epoxy system consisting essentially of an uncured epoxy resin and a hardening agent of phosphorus trihalide wherein the uncured epoxy resin is represented by the structure:

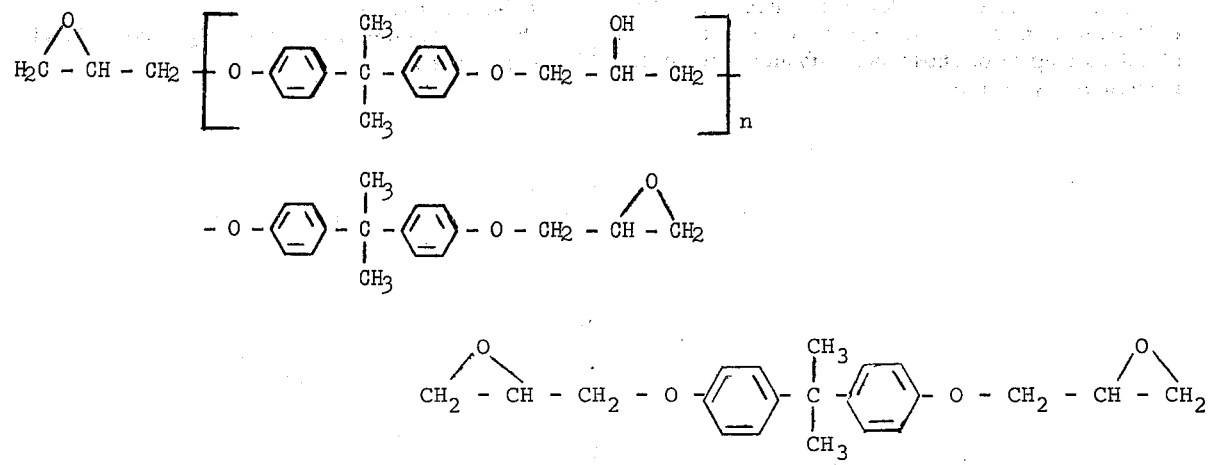

wherein $n$ ranges from essentially zero to about 30 and wherein the uncured epoxy resin and hardening agent have a ratio of epoxy equivalent weight to halogen equivalent weight ranging from 3:1 to 1:3.

2. An epoxy system according to claim 1 wherein the hardening agent can be a chloride or a bromide.

3. An epoxy system according to claim 1 wherein the hardening agent is phosphorus trichloride.

4. An epoxy system according to claim 1 wherein the uncured epoxy resin is

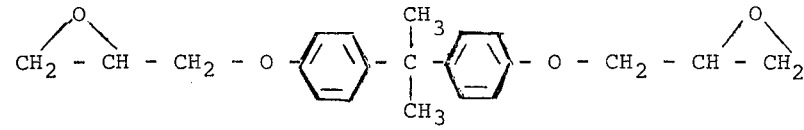

5. An epoxy system according to claim 1 wherein the ratio of epoxy equivalent weight to halogen equivalent weight is 1:1.

6. A cured, fire resistant epoxy resin consisting essentially of the reaction product of an uncured epoxy resin and a hardening agent of phosphorus trihalide wherein the uncured epoxy resin is:

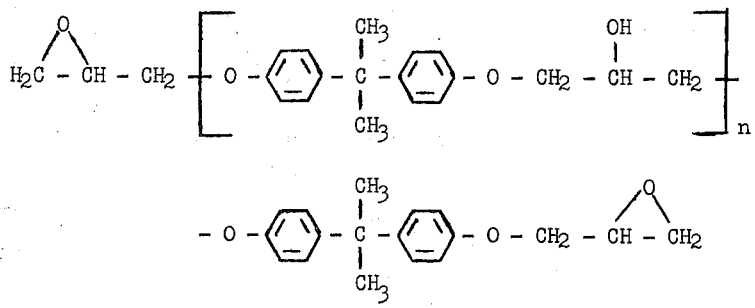

wherein $n$ ranges from essentially zero to about 30 and wherein the uncured epoxy resin and hardening agent have a ratio of epoxy equivalent weight to halogen equivalent weight ranging from 3:1 to 1:3.

7. A cured epoxy resin according to claim 6 wherein the hardening agent can be a chloride or a bromide.

8. A cured epoxy resin according to claim 6 wherein the hardening agent is phosphorus trichloride.

9. A cured epoxy resin according to claim 6 wherein the uncured epoxy resin is:

10. A cured epoxy resin according to claim 6 wherein the ratio of epoxy equivalent weight to halogen equivalent weight is 1:1.

11. A curable epoxy system consisting essentially of an uncured epoxy system, a hardening agent of phosphorus trihalide, and a mat of randomly oriented glass fibers, wherein the uncured epoxy resin is:

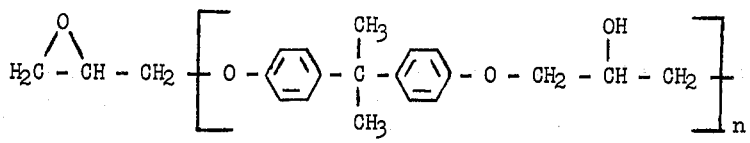

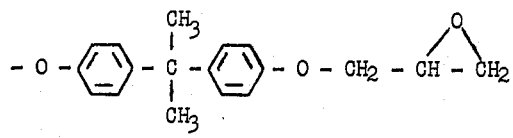

wherein n ranges from essentially zero to about 30 and wherein the uncured epoxy resin and hardening agent have a ratio of epoxy equivalent weight to halogen equivalent weight ranging from 3:1 to 1:3.

12. A curable epoxy system according to claim 11 wherein greater than zero and up to 50 weight percent of the system is glass fiber.

13. A curable epoxy system according to claim 11 wherein 15 to 50 weight percent of the system is glass fiber.

14. A cured, fire resistant epoxy resin consisting essentially of a mat of randomly oriented glass fibers and the reaction product of an uncured epoxy resin and a hardening agent of phosphorus trihalide wherein the uncured epoxy resin is:

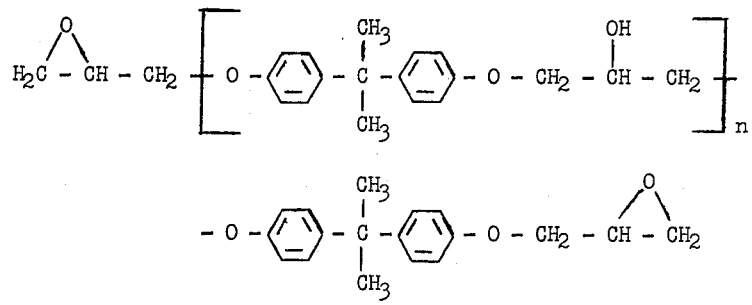

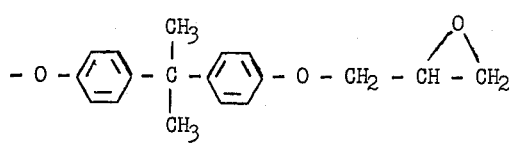

wherein n ranges from essentially zero to about 30 and wherein the uncured epoxy resin and hardening agent have a ratio of epoxy equivalent weight to halogen equivalent weight ranging from 3:1 to 1:3.

15. A cured, fire resistant epoxy resin according to claim 14 wherein greater than zero and up to 50 weight percent of the system is glass fibers.

16. A cured, fire resistant epoxy resin according to claim 15 wherein 15 to 50 weight percent of the system is glass fiber.

17. A cured epoxy resin according to claim 6 which is self-extinguishing.

18. A cured epoxy resin according to claim 14 which is self-extinguishing.

* * * * *